(12) United States Patent
Seki

(10) Patent No.: US 9,951,807 B2
(45) Date of Patent: Apr. 24, 2018

(54) HALF BEARING

(71) Applicant: TAIHO KOGYO CO., LTD., Toyota-shi, Aichi (JP)

(72) Inventor: Daisuke Seki, Toyota (JP)

(73) Assignee: Taiho Kogyo Co., Ltd. (JP)

( * ) Notice: Subject to any disclaimer, the term of this patent is extended or adjusted under 35 U.S.C. 154(b) by 0 days.

(21) Appl. No.: 15/504,871

(22) PCT Filed: Aug. 24, 2016

(86) PCT No.: PCT/JP2016/074652
§ 371 (c)(1),
(2) Date: Feb. 17, 2017

(87) PCT Pub. No.: WO2017/090287
PCT Pub. Date: Jun. 1, 2017

(65) Prior Publication Data
US 2017/0276168 A1 Sep. 28, 2017

(30) Foreign Application Priority Data
Nov. 24, 2015 (JP) .................................. 2015-228738

(51) Int. Cl.
*F16C 9/02* (2006.01)
*F16C 33/04* (2006.01)

(52) U.S. Cl.
CPC .............. *F16C 9/02* (2013.01); *F16C 33/046* (2013.01)

(58) Field of Classification Search
CPC .................................. F16C 9/02; F16C 33/046
See application file for complete search history.

(56) References Cited

U.S. PATENT DOCUMENTS

| 7,281,854 | B2 * | 10/2007 | Terada ..................... F01M 1/06 384/288 |
| 9,046,124 | B2 * | 6/2015 | Beaurepaire .............. F16C 3/14 |
| 9,062,714 | B2 * | 6/2015 | Kato .................... F16C 33/1055 |
| 9,593,711 | B2 * | 3/2017 | Kato ......................... F16C 9/02 |
| 2005/0047689 | A1 | 3/2005 | Yamazaki et al. |

FOREIGN PATENT DOCUMENTS

| JP | 2005-069283 A | 3/2005 |
| JP | 2005-076755 A | 3/2005 |
| JP | 2015-152106 A | 8/2015 |

* cited by examiner

*Primary Examiner* — Thomas R Hannon
(74) *Attorney, Agent, or Firm* — Harness, Dickey & Pierce, P.L.C.

(57) ABSTRACT

A half bearing includes a bearing body having a semi-circular tube shape with mating surfaces and that come into contact with a half bearing, and an oil groove that is provided on the sliding surface and extends in a rotational direction of a shaft. The oil groove has a curved shape in a cross section parallel to the shaft direction, the width of the oil groove is uniform in a range of at least ±30° in a cross section orthogonal to the shaft direction, and the width of the oil groove is smaller than the width in the range, in at least a region on the downstream side in the rotational direction among regions outside of the range.

10 Claims, 10 Drawing Sheets

FIG. 4A
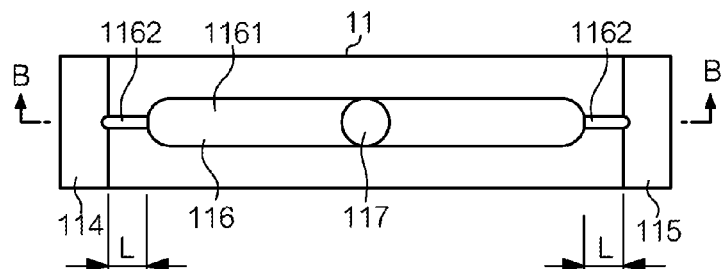
FIG. 4B
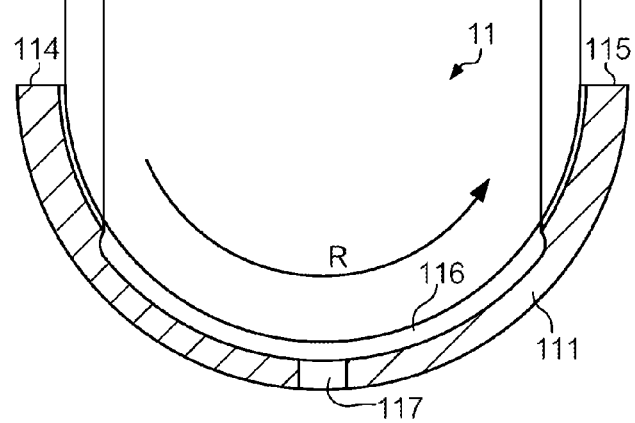
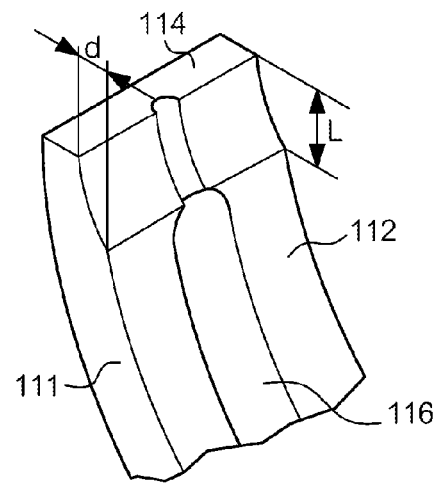
FIG. 5

1

HALF BEARING

CROSS-REFERENCE TO RELATED APPLICATIONS

This application is a U.S. National Stage Application of International Application No. PCT/JP2016/074652, filed on Aug. 24, 2016, which claims priority to Japanese Application No. 2015-228738, filed on Nov. 24, 2015. The entire disclosures of the above applications are incorporated herein by reference.

TECHNICAL FIELD

The present invention relates to a half bearing.

BACKGROUND ART

There are known to be half bearings that are used in automobile engines and the like. Some half bearings are provided with oil grooves for holding lubricating oil. JP 2005-76755A discloses a half bearing having a sliding surface, an oil groove being formed in an entire region in a circumferential direction of the sliding surface.

DISCLOSURE OF INVENTION

Problem to be Solved by the Invention

In the bearing disclosed in JP 2005-76755A, the lubricating oil sometimes leaks from mating surfaces. By contrast, the present invention provides a half bearing in which the amount of leaked oil is reduced.

Means for Solving the Problem

The present invention provides a half bearing including: a bearing body with a semi-circular tube shape having an inner circumferential surface serving as a sliding surface that slides along a shaft, and mating surfaces that come into contact with another half bearing; and an oil groove that is provided on the sliding surface and extends in a rotational direction of the shaft, wherein the oil groove has a curved shape in a cross section parallel to a shaft direction in which the shaft extends, a width of the oil groove as viewed from the sliding surface side is uniform in a range of at least ±30° with respect to the center of the bearing body, in a view from the center of a virtual circle inscribed on the sliding surface in the cross section orthogonal to the shaft direction, and in at least a region on a downstream side in the rotational direction among regions outside of the range, a width of the oil groove is smaller than the width of the oil groove in the range.

Outside of the range, the oil groove may become shallower toward the mating surfaces.

The bearing body may have a crush relief, and on the downstream side in the rotational direction of the shaft, the depth of the oil groove may be at its minimum at a position toward the center of the bearing body with respect to the crush relief.

The bearing body may have a crush relief, and on the downstream side in the rotational direction of the shaft, the depth of the oil groove may be at its minimum at a position in the crush relief.

On the downstream side in the rotational direction of the shaft, the depth of the oil groove may be at its minimum at a position on the mating surface.

The bearing body may have a crush relief, and in at least a range from the crush relief to the mating surface on the downstream side in the rotational direction of the shaft, the oil groove may have a uniform width that is smaller than a width of the oil groove at a central portion of the bearing body.

In a range from the crush relief to the mating surface on the upstream side in the rotational direction of the shaft, the oil groove may have a uniform width that is smaller than a width of the oil groove at a central portion of the bearing body.

On the upstream side in the rotational direction of the shaft, the oil groove need not reach the mating surface.

Starting from a position outside of the range, the width of the oil groove may gradually decrease toward the mating surface.

Starting from a position outside of the range, the depth of the oil groove may gradually decrease toward the mating surface.

Effects of the Invention

According to the present invention, the amount of oil leaked can be reduced.

BRIEF DESCRIPTION OF DRAWINGS

FIGS. 4A and 4B are diagrams illustrating a cross-sectional structure of half bearing 11.

FIG. 5 is a diagram illustrating a crush relief.

BEST MODE FOR CARRYING OUT THE INVENTION

1. Structure

Figure 1:
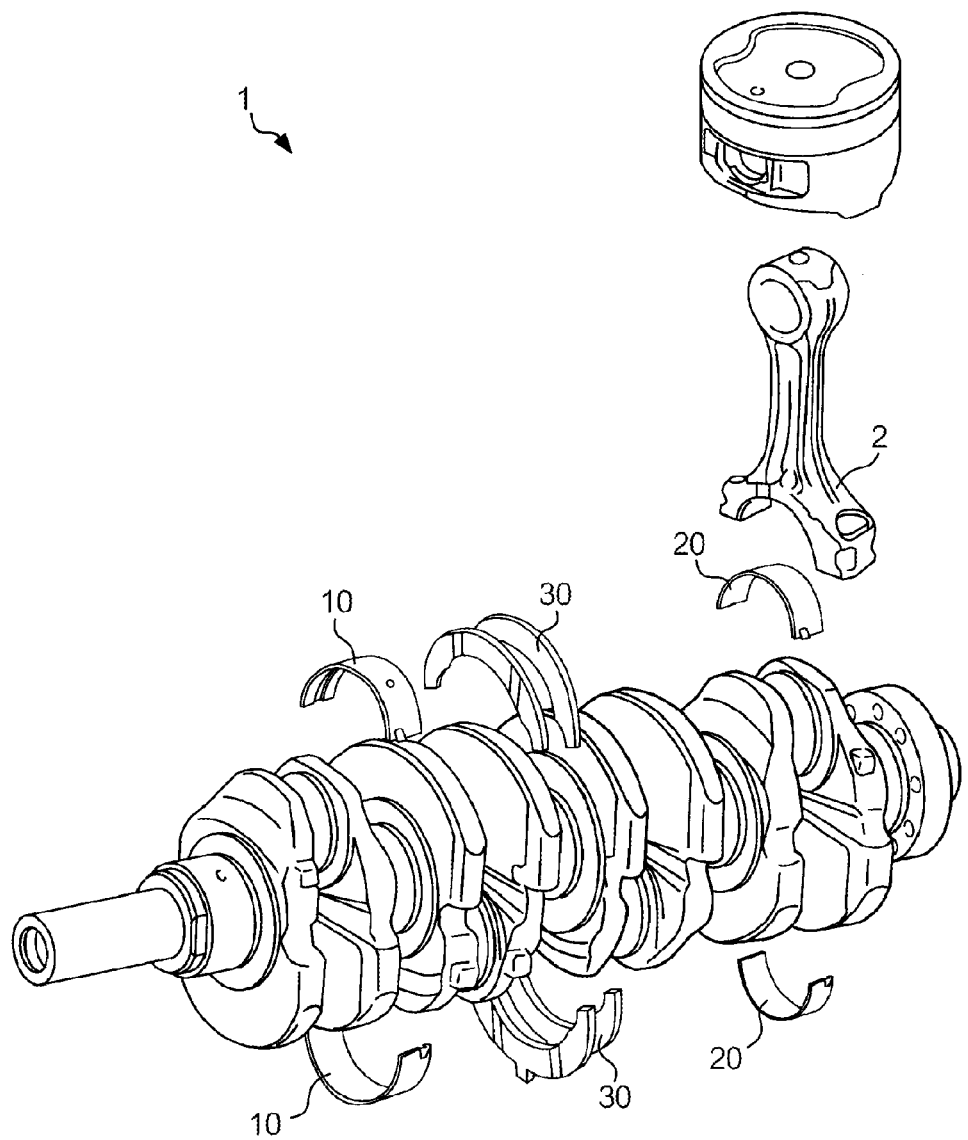
FIG. 1 is a diagram illustrating crankshaft 1 in an internal combustion engine.

FIG. 1 is a diagram illustrating crankshaft 1 in an internal combustion engine. In crankshaft 1, main bearing 10, connecting rod bearing 20, and crank washer 30 are used. Main bearing 10 is a bearing that is mounted on a housing (not shown) for a cylinder block (not shown) to hold a journal of crankshaft 1 and support crankshaft 1. Connecting rod bearing 20 is a bearing that is mounted on connecting rod 2 to hold a pin of crankshaft 1 and support connecting rod 2. Crank washer 30 is a bearing that is used in combination with main bearing 10 to support the force in the shaft direction of crankshaft 1. Crank washer 30 also has a function of positioning crankshaft 1 and the cylinder block in the shaft direction.

Figure 2:
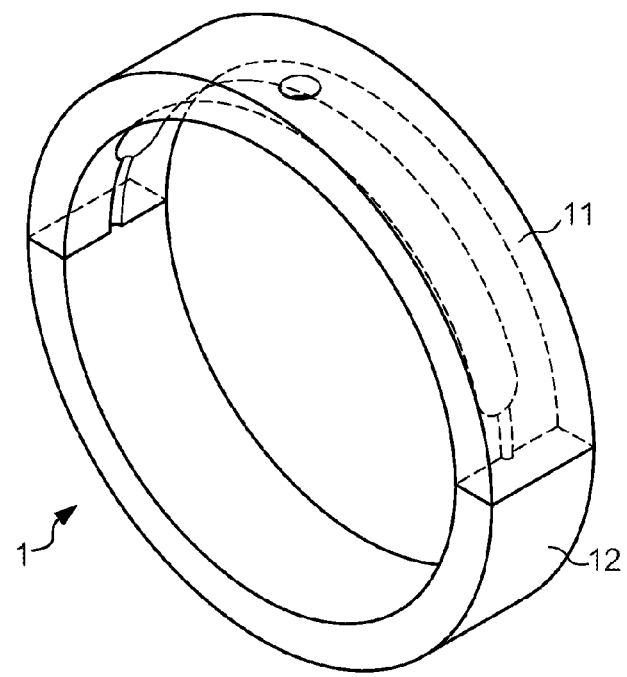
FIG. 2 is a diagram illustrating the exterior of main bearing 10.

FIG. 2 is a diagram illustrating the exterior of main bearing 10. Main bearing 10 is constituted by two bearings (half bearing 11 and half bearing 12) each with a semi-circular tube shape. Half bearing 11 is a bearing (upper bearing) that is mounted on the piston side in a view from crankshaft 1, and half bearing 12 is a bearing (lower bearing) that is mounted on the side opposite thereto. Half bearing 11 is an example of a half bearing according to the present invention.

Figure 3:
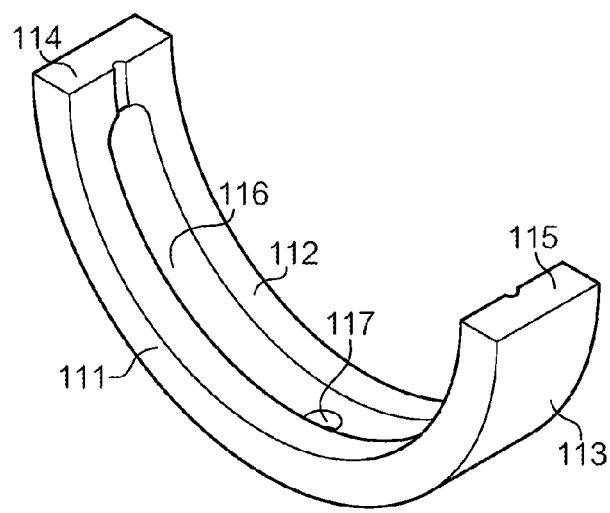
FIG. 3 is a diagram illustrating the exterior of half bearing 11.

FIG. 3 is a diagram illustrating the exterior of half bearing 11. Half bearing 11 has bearing body 111. In this example, bearing body 111 has a two-layer structure with a back plate and a lining layer. The back plate is a layer for reinforcing the mechanical strength of the lining layer. The back plate is formed of steel, for example. The lining layer is provided along the sliding surface (surface in contact with the shaft) of the bearing, and is a layer for providing bearing properties such as a frictional property, seizing resistance, wear resistance, conformability, a foreign matter embedding property (robustness against foreign matter), and corrosion resistance. The lining layer is formed of a bearing alloy. In order to prevent adhesion to the shaft, a material type that is the same as that of the shaft is avoided, and a material type different from that of the shaft is used as the bearing alloy. In this example, an aluminum alloy is used as the bearing alloy since the bearing is used for a shaft formed of steel. Note that other than an aluminum alloy, an alloy that uses a metal other than aluminum as a base, such as a copper alloy, may be used.

In the case of using an aluminum alloy, one or more elements among Cr, Si, Mn, Sb, Sr, Fe, Ni, Mo, Ti, W, Zr, V, Cu, Mg, and Zn in an amount of 10 mass % or less, and one or more elements among Sn, Pb, In, Tl, and Bi in an amount of 20 mass % or less may be included, although there is no particular limitation as to the composition of the aluminum alloy. The elements in the former group provide mainly strength and wearing resistance, the elements in the latter group provide mainly conformability, and the bearing properties are adjusted according to the type and amount of the added elements.

In the case of using a copper alloy, at least one of Pb and Bi in an amount of 25 mass % or less, Sn in an amount of 10 mass % or less, and P, Ag, In, Ni, Al, and the like in an amount of 2 mass % or less may be included, although there is no particular limitation as to the composition of the copper alloy. In these elements, Pb and Bi, which are soft metals, provide conformability. Sn provides strength and wear resistance. The other components secondarily improve the properties. In particular, P is useful for deoxidation, promoting sintering, strengthening, and the like. Ag forms a compound that is useful for improving sliding properties due to a reaction with an impurity component S in the lubricating oil or copper. In improves corrosion resistance and wettability of the lubricating oil. Ni and Al strengthen the copper.

Bearing body 111 is molded into a semi-circular tube shape and has inner circumferential surface 112 (sliding surface) that slides along crankshaft 1, and outer circumferential surface 113 that comes into contact with a housing (not shown). The diameter of crankshaft 1 is $\varphi$ 30 to 150 mm, for example, and bearing body 111 has an inner diameter that matches the diameter of crankshaft 1. Furthermore, bearing body 111 has mating surface 114 and mating surface 115 that come into contact with half bearing 12.

Half bearing 11 has oil groove 116 on inner circumferential surface 112. Oil groove 116 is a groove for supplying the lubricating oil to the sliding surface and furthermore holding the lubricating oil that was supplied. Also, oil groove 116 is provided with at least one oil hole 117 passing through from outer circumferential surface 113 to inner circumferential surface 112. The portion of crankshaft 1 that is supported by half bearing 11 is provided with an oil hole (not shown) at a position opposite oil groove 116. The oil hole passes through to the portion of crankshaft 1 that is supported by connecting rod bearing 20. Lubricating oil is supplied to outer circumferential surface 113 of half bearing 11 via an oil path (not shown) provided in the cylinder block. The lubricating oil supplied to outer circumferential surface 113 is supplied to inner circumferential surface 112 (sliding surface) via oil hole 117 and lubricates the main bearing. The lubricating oil of the sliding surface is supplied to the sliding surface of connecting rod bearing 20 via the oil hole of crankshaft 1. That is, oil groove 116 also has a function of holding the lubricating oil to be supplied to connecting rod bearing 20.

FIG. 4 is a diagram illustrating the cross-sectional structure of half bearing 11. FIG. 4(A) is an external view of half bearing 11 as viewed from a direction orthogonal to the mating surfaces. FIG. 4(B) is a cross-sectional view taken along line B-B in FIG. 4(A). This cross section is a cross section orthogonal to the shaft direction (cross section parallel to sliding direction). In this diagram, R indicates the rotational direction of crankshaft 1. In other words, in this diagram, the right side is the downstream side in the rotational direction. In this cross section, the thickness of bearing body 111 is not uniform. Bearing body 111 is at its thickest at its central portion and becomes thinner toward its end portions (mating surfaces). This is because the center of an inner diameter circle (circle drawn by inner circumferential surface 112) is decentered (shifted) toward the outside from the center of an outer diameter circle (circle drawn by outer circumferential surface 113). A so-called oil relief is formed due to this decentering. An oil relief refers to a gap in the inner circumferential surface with respect to a circle whose center is on the central portion of the half bearing inner circumferential surface (circle centered about the central portion of the inner circumferential surface). The depth (amount) of the oil relief is measured using a certain height (e.g., 6 to 13 mm) from the mating surface as a reference, and is 0.005 to 0.025 mm for example. The oil relief expands the oil clearance near the mating surfaces and assists in the formation of wedge film pressure. Moreover, the oil relief assists in the formation of an oil film, increases the amount of oil, and cools the bearing.

Furthermore, bearing body 111 is provided with crush reliefs. A crush relief refers to a portion that is recessed with respect to the inner diameter circle over the entire width of bearing body 111 at portions of inner circumferential surface 112 that come into contact with mating surface 114 and mating surface 115, or in other words, a relief that is provided with respect to the entire width of bearing body 111. Note that as is evident from this definition, "inner diameter circle" refers to a circle inscribed on portions of the inner circumferential surface 112 other than the crush reliefs.

FIG. 5 is a diagram illustrating a crush relief. Note that here, for the sake of description, the crush relief is illustrated in a manner that is exaggerated compared to the actual crush relief (in particular, the depth is exaggerated). The difference between the positions of the inner diameter circle and inner circumferential surface 112 at the position of the mating surface is referred to as depth d of the crush relief, and the length of the portion of inner circumferential surface 112 at which the crush relief is formed is referred to as length L of the crush relief. Depth d of the crush relief is 0.01 to 0.06 mm, for example, and length L of the crush relief is 4 to 9.5 mm, for example. Even when the portions of inner circumferential surface 112 near the mating surfaces are pushed slightly toward a counterpart shaft when the bearing is assembled on the housing, the crush reliefs prevent contact with the shaft. The crush reliefs have an effect of cooling the bearing by allowing the lubricating oil to be discharged near the mating surfaces, and an effect of discharging foreign matter that has entered the sliding surface. Note that FIG. 4 and subsequent drawings show ranges L, which correspond to crush reliefs.

FIG. 4 will be referenced once again. In this example, oil groove 116 is formed over the entire length in the sliding direction, from mating surface 114 to mating surface 115. However, the width of oil groove 116 (length in the shaft direction of the groove when viewing half bearing 11 from a direction orthogonal to the mating surfaces; hereinafter referred to as "groove width") is not uniform, but is relatively thin (narrow) in the crush reliefs and relatively thick (wide) at portions other than the crush reliefs. Hereinafter, the portion of oil groove 116 that is relatively thick will be referred to as thick groove 1161, and the relatively thin portion will be referred to as thin groove 1162. The groove width does not change continuously (i.e., gradually) from thick groove 1161 to thin groove 1162, but decreases rapidly. Note that the groove width of thick groove 1161 is uniform except for the vicinity of the border to thin groove 1162, and the groove width of thin groove 1162 is uniform. Note that the groove width being uniform means that variation in the groove width is within a certain range, and for example, is 1/10 or less of the groove width, and preferably 1/100 or less of the groove width.

Also, the depth of oil groove 116 is not uniform, but is relatively small in the crush relief and relatively large at portions other than the crush relief. In other words, thick groove 1161 is relatively deep, and thin groove 1162 is relatively shallow. The groove depth does not change continuously (i.e., gradually) from thick groove 1161 to thin groove 1162, but decreases rapidly. Note that the depth of thick groove 1161 is uniform and the depth of thin groove 1162 is uniform. Note that the depth being uniform means that variation in the depth is within a certain range, and for example, is 1/10 or less of the depth of the groove, and preferably 1/100 or less of the depth of the groove, or that variation in the depth is smaller than the misalignment between the center of the inner diameter circle and the center of the outer diameter circle. However, strictly speaking, there are cases where the bearing body 111 is manufactured such that the thickness thereof at the bottom of the groove is uniform, and in such a case, the thickness of the groove fluctuates by an amount corresponding to the oil relief and the crush relief.

Thus, due to oil groove 116 being relatively thick and deep at the portion other than the crush reliefs, it is possible to sufficiently ensure the volume of oil groove 116, or in other words, to sufficiently ensure the amount of lubricating oil to be supplied to the sliding surface or the connecting rod bearing. Moreover, due to oil groove 116 being relatively thin and shallow at the portions in the crush reliefs, it is possible to reduce the amount of oil that leaks from mating surface 114 and mating surface 115 in comparison to the case where the width and depth of the oil groove are uniform.

Figure 6A:
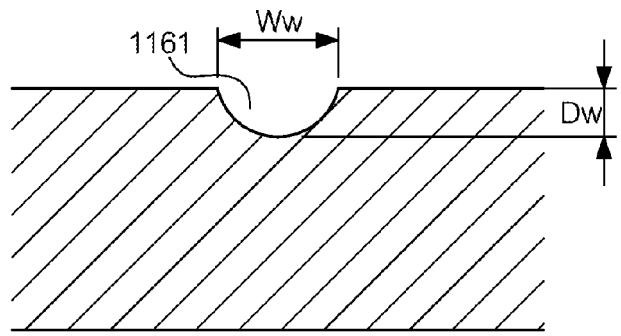
FIGS. 6A and 6B are diagrams illustrating a cross-sectional structure of oil groove 116.
Figure 6B:
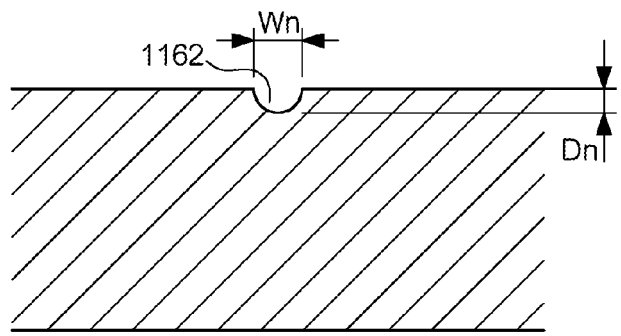

FIG. 6 is a diagram illustrating the cross-sectional structure of oil groove 116. FIG. 6 shows a cross section orthogonal to the sliding direction (cross section parallel to the shaft direction). FIG. 6(A) shows a cross section of thick groove 1161 and FIG. 6(B) shows a cross section of thin groove 1162. In this cross section, thick groove 1161 and thin groove 1162 both have curved shapes, and more specifically, have circular arc shapes. In particular, in thin groove 1162, a circular arc is used as the cross-sectional shape, whereby the cross-sectional area can be reduced and the amount of oil that leaks from mating surface 114 and mating surface 115 can be reduced in comparison with a square-shaped groove with a cross-sectional shape having the same groove width and depth. Groove width Ww of thick groove 1161 is 2 to 5 mm, for example, and depth Dw of thick groove 1161 is smaller than groove width Ww, and is 0.5 to 1.5 mm, for example. Groove width Wn of narrow groove 1162 is narrower than groove width Ww, and depth Dn of narrow groove 1162 is shallower than depth Dw.

2. Manufacturing Method

Figure 7:
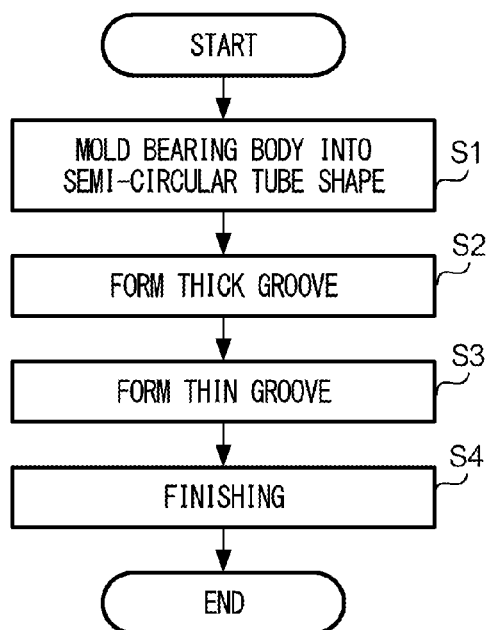
FIG. 7 is a diagram illustrating a method for manufacturing half bearing 11.

FIG. 7 is a diagram illustrating a method for manufacturing half bearing 11. In step S1, the bearing body is molded into a semi-circular tube shape. In step S2, the thick groove is formed in the sliding surface. In step S3, the thin groove is formed in the sliding surface. In step S4, finishing processing is performed.

Figure 8:
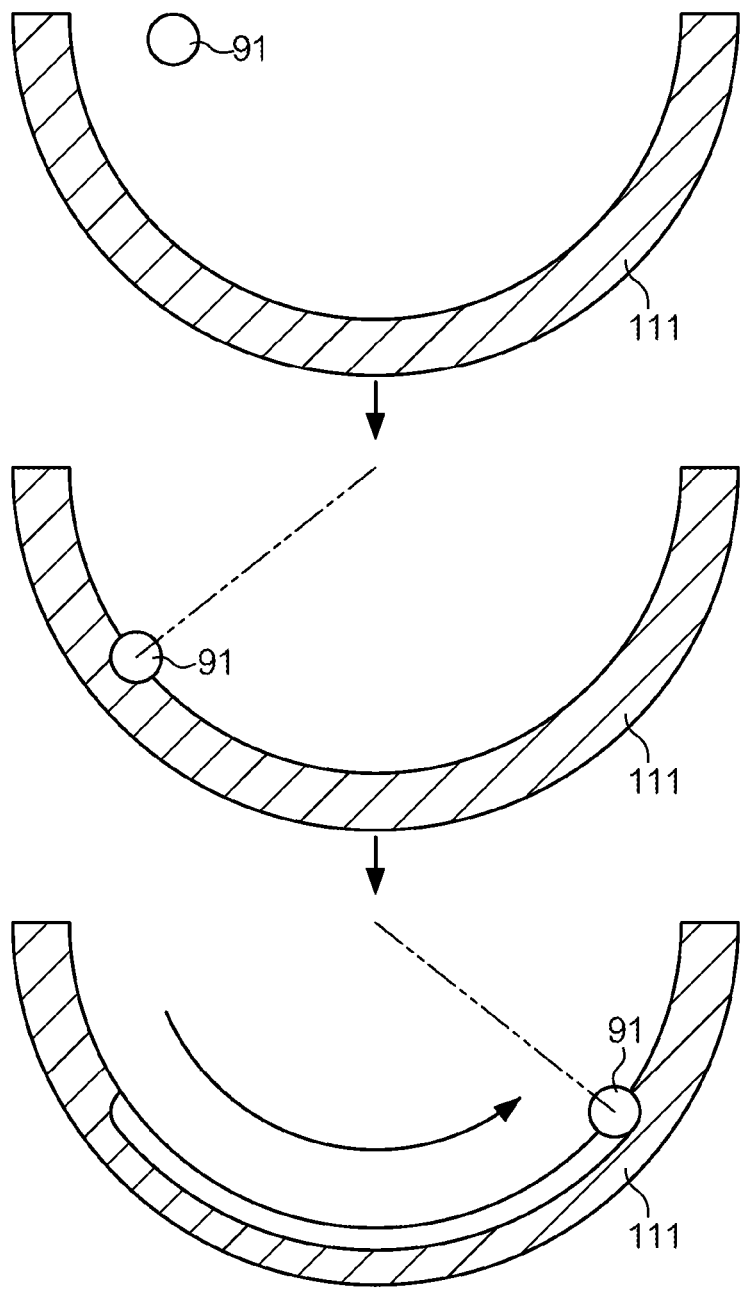
FIG. 8 is a diagram illustrating a step of forming a thick groove.

FIG. 8 is a diagram illustrating a step of forming a thick groove. The thick groove is formed through cutting using rotary blade 91. Rotary blade 91 has a blade width that corresponds to the groove width of the thick groove 1161. Rotary blade 91 is rotated (spun) using the center of the blade as the rotary axis, and is moved (revolved) centered about the center of the inner diameter circle of the bearing body so as to draw a circular arc in a range outside of the crush reliefs. Thereby, the thick groove is formed.

Figure 9:
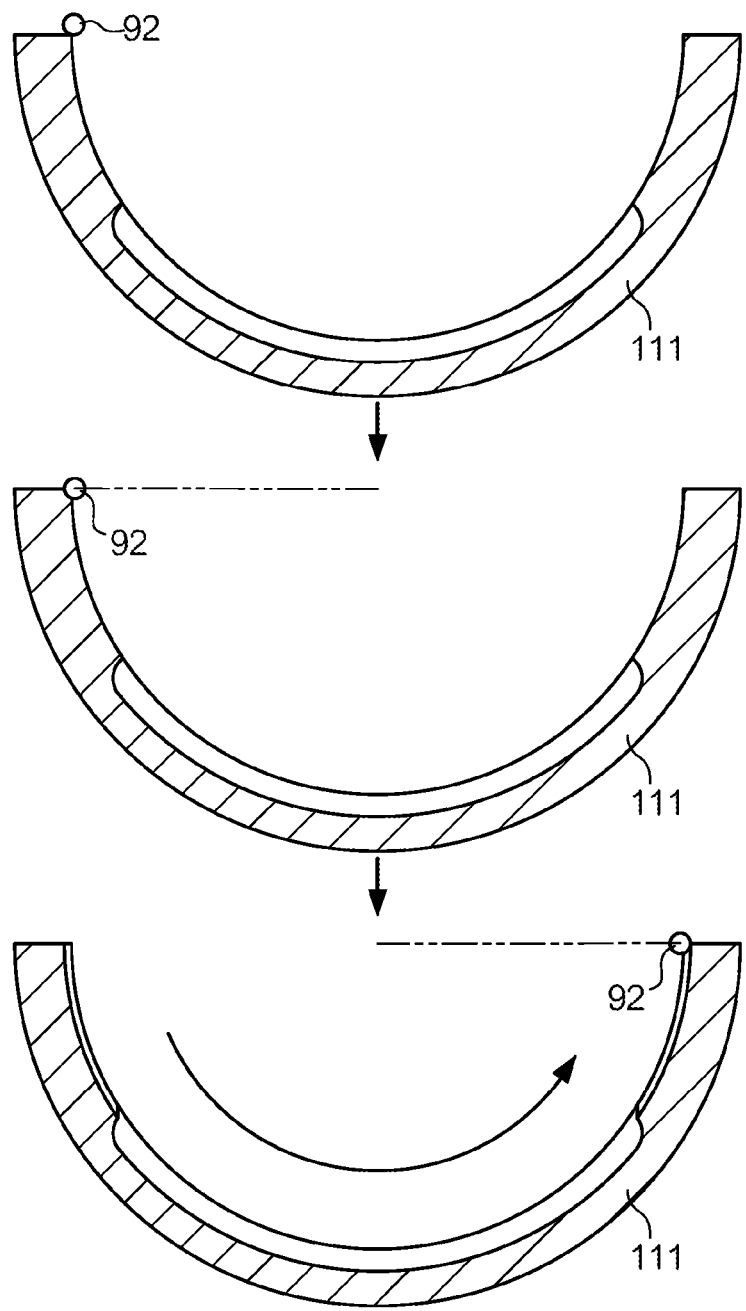
FIG. 9 is a diagram illustrating a step of forming a thin groove.

FIG. 9 is a diagram illustrating a step of forming thin grooves. The thin grooves are formed through cutting using rotary blade 92. Rotary blade 92 has a blade width that corresponds to the groove width of thin grooves 1162. Rotary blade 92 is rotated (spun) using the center of the blade as the rotary axis, and is moved (revolved) centered about the center of the inner diameter circle of the bearing body so as to draw a circular arc in the ranges including the crush reliefs. Thereby, the thin grooves are formed.

Note that the thin grooves may be formed using rotary blade 91 instead of using rotary blade 92, which is different from rotary blade 91. Since the shape of the blade tip is a circular arc, if the depth at which rotary blade 91 comes into contact with bearing body 111 is changed, a thin groove can be formed. In this case, the thin grooves are not formed after the thick groove is formed, and by changing the depth at which rotary blade 91 is brought into contact from one end to another end of bearing body 111, and more specifically, bringing rotary blade 91 into contact more shallowly at the portions corresponding to thin grooves 1162 and more deeply at the portion corresponding to thick groove 1161, thin grooves 1162 and thick groove 1161 may be formed by merely causing rotary blade 91 to perform one cycle (i.e., one stroke) along the inner circumferential surface.

The finishing processing mentioned in step S4 includes forming an oil groove, forming an oil hole, forming a fine groove, forming an inner surface shape, and chamfering, for example.

3. Modified Examples

The present invention is not limited to the above-described embodiment, and various modifications are possible. Hereinafter, several modified examples will be described. Two or more of the following modified examples may be used in combination with each other.

3-1. Modified Example 1

Figure 10A:
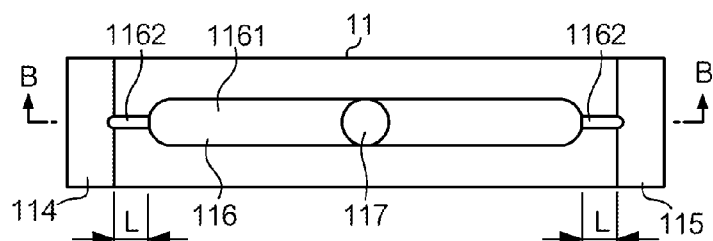
FIGS. 10A and 10B are diagrams showing a structure of oil groove 116 according to Modified Example 1.
Figure 10B:
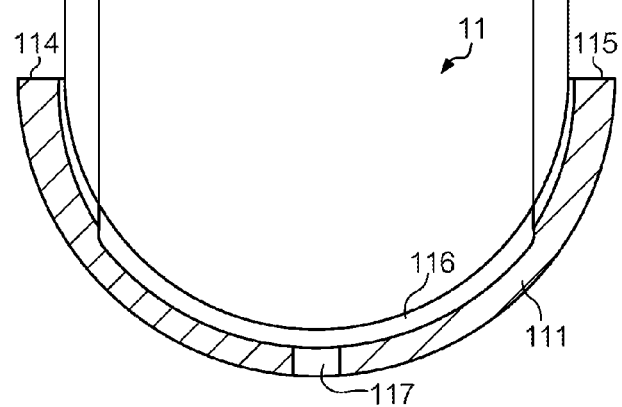

FIG. 10 is a diagram showing a structure of oil groove 116 according to Modified Example 1. In this example, the depths of thin grooves 1162 are not uniform, and the depths of the end portions near the mating surfaces of thin grooves 1162 are shallower than the depths of the end portions near the center. Thin grooves 1162 gradually become shallower toward the mating surfaces in the example shown in FIG. 10(A). According to this example, the amount of oil that leaks from the mating surfaces can be reduced in comparison to the case where the depth of thin grooves 1162 is uniform and thin grooves 1162 reach the mating surfaces.

3-2. Modified Example 2

Figure 11A:
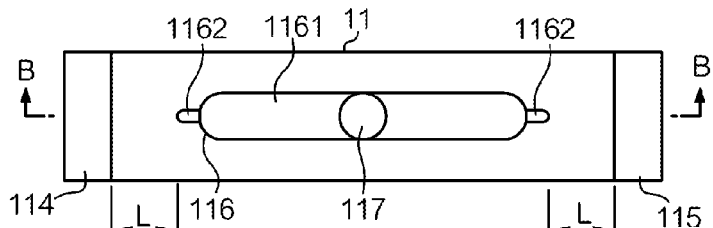
FIGS. 11A and 11B are diagrams showing a structure of oil groove 116 according to Modified Example 2.
Figure 11B:
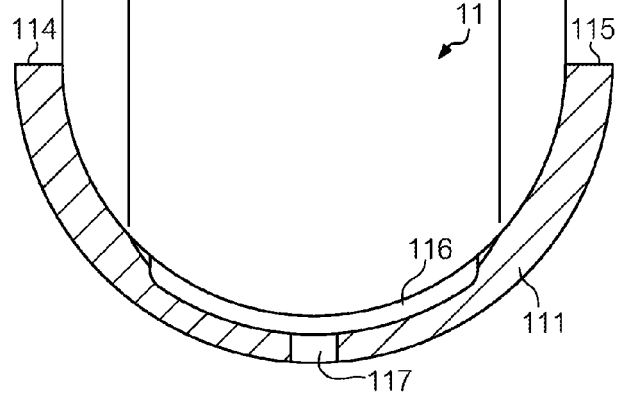

FIG. 11 is a diagram showing a structure of oil groove 116 according to Modified Example 2. In this example, the depths of thin grooves 1162 are not uniform, and thin grooves 1162 do not reach the mating surfaces. In other words, the depths reach zero before thin grooves 1162 reach the mating surfaces (hereinafter, this state is referred to as the grooves "rising"). In this example, thin grooves 1162 rise before the crush reliefs in a view from the central portion of bearing body 111. According to this example, the amount of oil that leaks from the mating surfaces can be reduced in comparison to the case where thick grooves 1161 reach the crush reliefs.

3-3. Modified Example 3

Figure 12A:
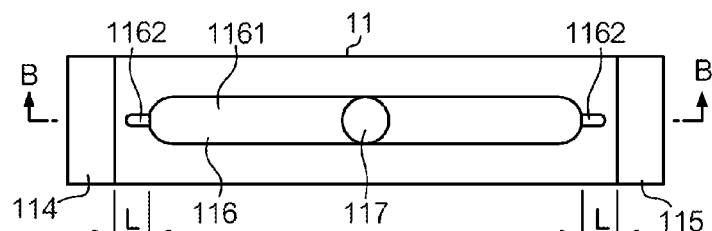
FIGS. 12A and 12B are diagrams showing a structure of oil groove 116 according to Modified Example 3.
Figure 12B:
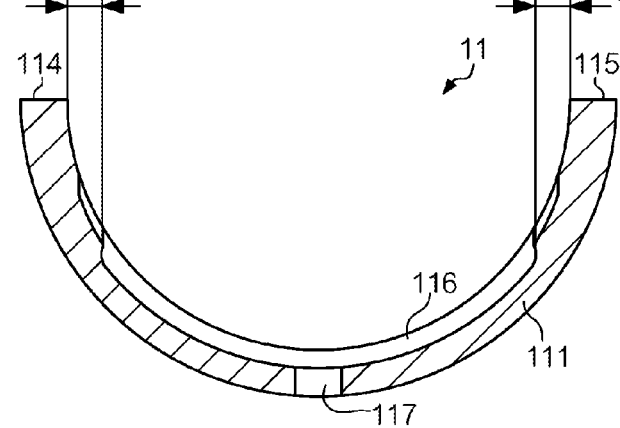

FIG. 12 is a diagram showing a structure of oil groove 116 according to Modified Example 3. In this example, the depths of thin grooves 1162 are not uniform, and thin grooves 1162 do not reach the mating surfaces. In other words, thin grooves 1162 rise before reaching the mating surfaces. In this example, thin grooves 1162 rise in the crush reliefs. According to this example, the amount of oil that leaks from the mating surfaces can be reduced in comparison to the example in which thin grooves 1162 reach the mating surfaces.

3-4. Modified Example 4

Figure 13A:
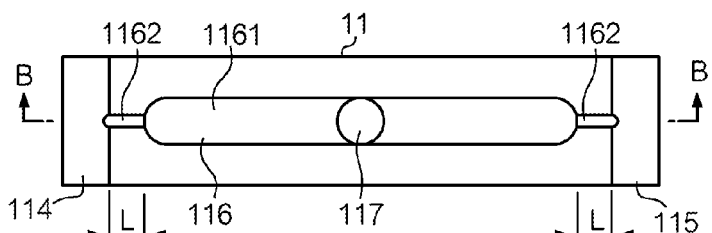
FIGS. 13A and 13B are diagrams showing a structure of oil groove 116 according to Modified Example 4.
Figure 13B:
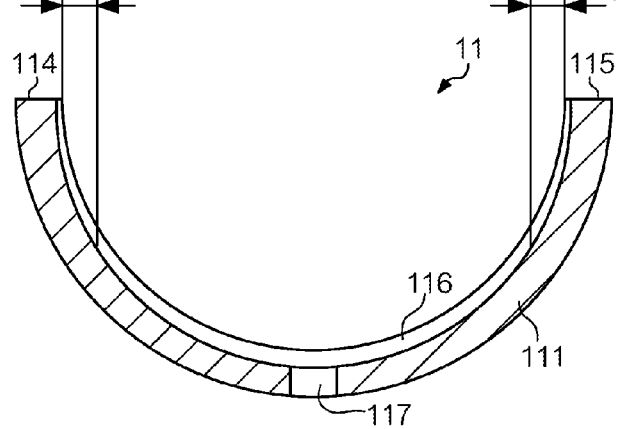

FIG. 13 is a diagram showing a structure of oil groove 116 according to Modified Example 4. In this example, the depth of thick groove 1161 is uniform, but the depths of thin grooves 1162 are not uniform, and thin grooves 1162 reach the mating surfaces. Thin grooves 1162 gradually become shallower toward the mating surfaces and become shallowest at the mating surfaces. The depths of thick groove 1161 and thin grooves 1162 are the same at the boundaries therebetween. In other words, the depth changes smoothly from thick groove 1161 to thin groove 1162. According to this example, machining can be performed easily in comparison to the example in which the depths of thin grooves 1162 are uniform and thin grooves 1162 reach the mating surfaces.

3-5. Modified Example 5

Figure 14A:
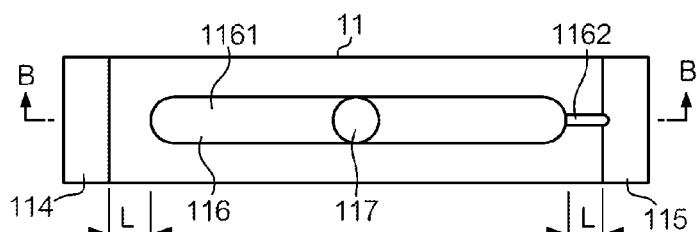
FIGS. 14A and 14B are diagrams showing a structure of oil groove 116 according to Modified Example 5.
Figure 14B:
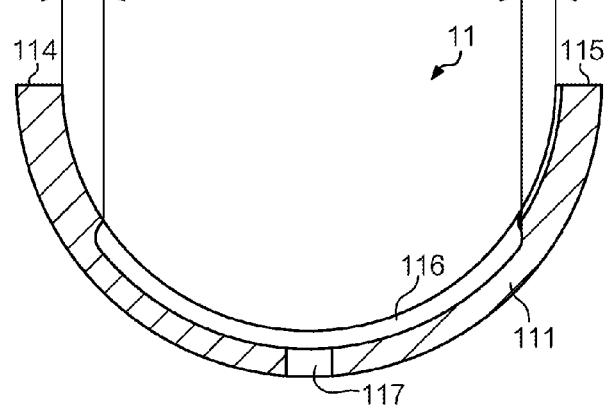

FIG. 14 is a diagram showing a structure of oil groove 116 according to Modified Example 5. In this example, thin groove 1162 is not symmetrical between the upstream side and the downstream side in the rotational direction of crankshaft 1. More specifically, thin groove 1162 does not exist on the upstream side in the rotational direction, and thin groove 1162 exists only on the downstream side. The depth of thin groove 1162 is uniform. According to this example, leakage of the lubricating oil from the mating surface on the upstream side can be reduced. Note that thin groove 1162 that is shorter than on the downstream side (and has a length that is not zero) may be formed on the upstream side.

3-6. Modified Example 6

Figure 15A:
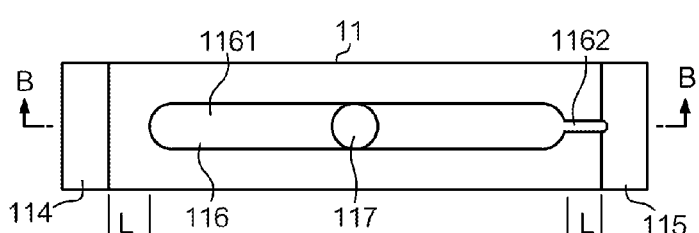
FIGS. 15A and 15B are diagrams showing a structure of oil groove 116 according to Modified Example 6.
Figure 15B:
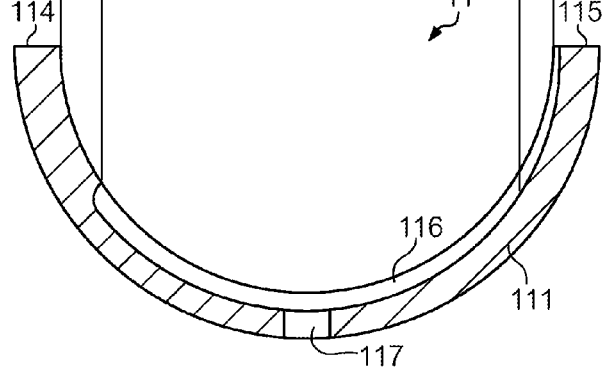

FIG. 15 is a diagram showing a structure of oil groove 116 according to Modified Example 6. In this example, thin groove 1162 is not symmetrical between the upstream side and the downstream side in the rotational direction of crankshaft 1. More specifically, thin groove 1162 does not exist on the upstream side in the rotational direction, and thin groove 1162 exists only on the downstream side. The depth of thin groove 1162 is not uniform and gradually becomes shallower toward the mating surface. According to this example, the amount of oil that leaks from the mating surface on the upstream side can be reduced in comparison to the example in which thin groove 1162 is symmetrical between the upstream side and the downstream side in the rotational direction. Also, due to thin groove 1162 reaching the mating surface on at least the downstream side in the rotational direction, a property of discharging foreign matter can be improved in comparison to a case where thin groove 1162 does not reach the mating surface.

3-7. Modified Example 7

The groove width of at least one of thick groove 1161 and thin groove 1162 need not be uniform. For example, thick groove 1161 may be at its thickest near its central portion in the rotational direction and gradually becomes thinner toward the end portions. Also, thin groove 1162 may become thinner toward the mating surface. According to this example, the amount of oil that leaks from the mating surfaces can be reduced in comparison to the case where the groove widths of thin grooves 1162 are uniform up to the mating surfaces.

3-8. Modified Example 8

Figure 16A:
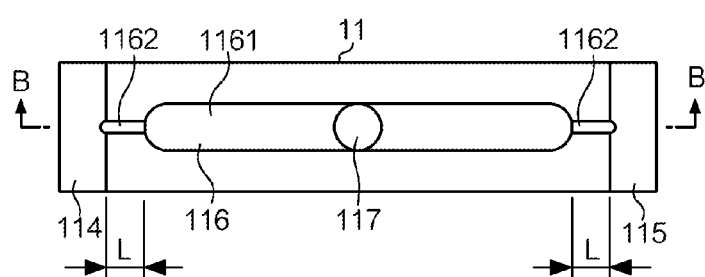
FIGS. 16A and 16B are diagrams showing a structure of oil groove 116 according to Modified Example 8.
Figure 16B:
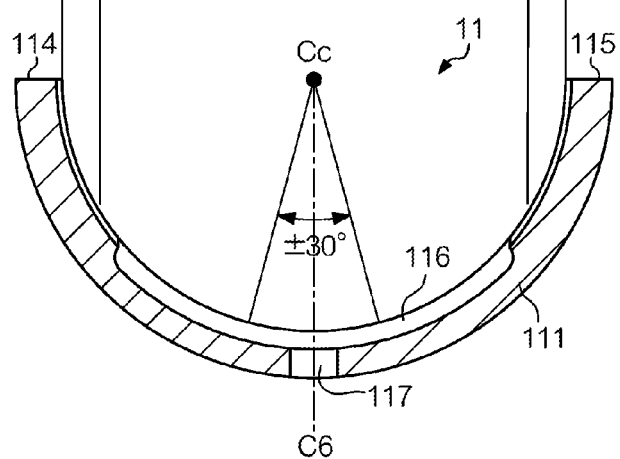

FIG. 16 is a diagram showing a structure of oil groove 116 according to Modified Example 8. In this example, thin grooves 1162 extend outside of the crush reliefs. Thick groove 1161 is formed in only a portion of the region outside of the crush reliefs, and not in the entire region outside of the crush reliefs. Thick groove 1161 need only be formed in a range of at least ±30° with respect to center Cb of bearing body 111, in a view from center Cc of the inner diameter circle (virtual circle inscribed on the sliding surface) in a cross section orthogonal to the shaft direction. From the viewpoint of ensuring the amount of oil held by oil groove 116, the range in which thick groove 1161 is formed is preferably wide, thick groove 1161 is more preferably formed in a range of at least ±45° with respect to center Cb, for example, and is even more preferably formed in a range of at least ±60°.

3-9. Other Modified Examples

The material constituting bearing body 111 is not limited to that described as an example in the embodiment. Bearing body 111 may have an overlay layer in addition to a back plate and a lining layer. The overlay layer is a layer for improving properties such as the friction coefficient, conformability, corrosion resistance, and foreign matter embedding property (robustness against foreign matter) of the lining layer. The overlay layer includes at least a binder resin, for example. A heat-curable resin is used as the binder resin, for example. Specifically, the binder resin includes at least one of a polyamide imide (PAI) resin, a polyimide (PI) resin, a polyamide resin, a phenol resin, a polyacetal resin, a polyether ether ketone resin, and a polyphenylene sulfide resin. The overlay layer may further include a solid lubricating material. The solid lubricating material is added in order to improve the friction property. For example, the solid lubricating material includes at least one of $MoS_2$, $WS_2$, polytetrafluoroethylene (PTFE), graphite, h-BN, and $SB_2O_3$. For example, $MoS_2$ provides a preferable lubricity. Also, since PTFE has a low intra-molecular cohesive force, it has an effect of reducing the frictional coefficient. Furthermore, graphite improves the wettability and improves the initial conformability. Initial conformability is a property by which the sliding surface wears, becomes smooth, and causes the sliding property to improve when coming into sliding contact with a counterpart member after the start of sliding. If the sliding property improves due to the expression of the initial conformability, the overall amount of wear of the sliding layer will decrease.

The half bearing according to the present invention is not limited to being used as an upper bearing of a main bearing. The half bearing according to the present invention may be used as the lower bearing of the main bearing, or it may be used in a bearing other than a main bearing, such as a connecting rod bearing.

In half bearing 11, at least one of a crush relief and an oil relief may be omitted. Also, the dimensions given in the embodiments in relation to half bearing 11 are merely exemplary, and the half bearing according to the present invention is not limited thereto.

The invention claimed is:

1. A half bearing comprising:
 a bearing body with a semi-circular tube shape having an inner circumferential surface serving as a sliding surface that slides with a shaft, and mating surfaces that come into contact with another half bearing; and
 an oil groove that is provided on the sliding surface and extends in a rotational direction of the shaft,
 wherein the oil groove has a curved shape in a cross section parallel to a shaft direction in which the shaft extends,
 a width of the oil groove as viewed from the sliding surface side is uniform in a range of at least ±30° with respect to the center of the bearing body, in a view from the center of a virtual circle inscribed on the sliding surface in the cross section orthogonal to the shaft direction, and
 in at least a region on a downstream side in the rotational direction among regions outside of the range, a width of the oil groove is smaller than the width of the oil groove in the range.

2. The half bearing according to claim 1, wherein outside of the range, the oil groove becomes shallower toward the mating surfaces.

3. The half bearing according to claim 1, wherein the bearing body has a crush relief, and
 on the downstream side in the rotational direction of the shaft, the depth of the oil groove is at its minimum at a position toward the center of the bearing body with respect to the crush relief.

4. The half bearing according to claim 1, wherein the bearing body has a crush relief, and
 on the downstream side in the rotational direction of the shaft, the depth of the oil groove is at its minimum at a position in the crush relief.

5. The half bearing according to claim 1, wherein on the downstream side in the rotational direction of the shaft, the depth of the oil groove is at its minimum at a position at the mating surface.

6. The half bearing according to claim 1, wherein the bearing body has a crush relief, and
 in at least a range from the crush relief to the mating surface on the downstream side in the rotational direction of the shaft, the oil groove has a uniform width that is smaller than a width of the oil groove at a central portion of the bearing body.

7. The half bearing according to claim 6, wherein in a range from the crush relief to the mating surface on the upstream side in the rotational direction of the shaft, the oil groove has a uniform width that is smaller than a width of the oil groove at a central portion of the bearing body.

8. The half bearing according to claim 1, wherein on the upstream side in the rotational direction of the shaft, the oil groove does not reach the mating surface.

9. The half bearing according to claim 1, wherein starting from a position outside of the range, the width of the oil groove gradually decreases toward the mating surface.

10. The half bearing according to claim 1, wherein starting from a position outside of the range, the depth of the oil groove gradually decreases toward the mating surface.

* * * * *